(12) United States Patent
Hoshina

(10) Patent No.: US 6,802,557 B2
(45) Date of Patent: Oct. 12, 2004

(54) REAR WINDOW STRUCTURE FOR VEHICLE

(75) Inventor: Shunsuke Hoshina, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/337,769

(22) Filed: Jan. 8, 2003

(65) Prior Publication Data

US 2003/0132646 A1 Jul. 17, 2003

(30) Foreign Application Priority Data

Jan. 16, 2002 (JP) .................................... P2002-007627

(51) Int. Cl.[7] .................................................. B60J 1/18
(52) U.S. Cl. ................ 296/201; 296/146.15; 52/204.53
(58) Field of Search ............................. 296/190.1, 201, 296/146.1, 146.15, 93; 52/204.5, 208, 204.53, 204.54

(56) References Cited

U.S. PATENT DOCUMENTS

| | | | | |
|---|---|---|---|---|
| 2,449,875 A | * | 9/1948 | Cadwallader | 52/208 |
| 2,550,300 A | * | 4/1951 | Schunk | 52/208 |
| 2,793,071 A | * | 5/1957 | Meyer | 296/200 |
| 3,274,740 A | * | 9/1966 | Hall | 52/208 |
| 3,744,201 A | * | 7/1973 | Dochnahl | 52/204.597 |
| 4,487,448 A | * | 12/1984 | Griffin | 296/146.15 |
| 4,712,826 A | * | 12/1987 | Omori | 296/93 |
| 4,905,432 A | * | 3/1990 | Romie | 52/208 |

* cited by examiner

*Primary Examiner*—Patricia L. Engle
(74) *Attorney, Agent, or Firm*—McDermott Will & Emery LLP

(57) ABSTRACT

A rear window structure constructed in a vehicle body, which includes a window panel, a peripheral portion of a window opening in the vehicle body to which the window panel is fitted and an exterior part covering a rim of the window panel. The peripheral portion includes a first platform molded to create a step difference toward an inside of a vehicle compartment, and a second platform of a different member from the first platform, molded to create a step difference from an inner circumference of the first platform toward the inside of the vehicle compartment. The rim of the window panel is fitted to the second platform of the peripheral portion, and the exterior part is fitted to the first platform thereof.

7 Claims, 4 Drawing Sheets

REAR WINDOW STRUCTURE FOR VEHICLE

BACKGROUND OF THE INVENTION

1. Field of Invention

The present invention relates to a rear window structure for a vehicle.

2. Description of the Related Art

In a general rear window structure, a rear window panel is fixedly adhered to a peripheral portion of a rearwindow opening provided in a rear portion of a vehicle body.

In the peripheral portion of the rear window opening, a platform, which is molded to create a step difference toward the inside of a vehicle compartment, is provided. A rim of the rear window panel is adhered to the platform, with a spacer made of an elastic material such as rubber, interposed therebetween.

SUMMARY OF THE INVENTION

In this rear window structure, the platform is formed by press molding a vehicle body panel. Due to deep drawing limit of the press molding, it is impossible to create a large step difference between an outer surface of the vehicle body panel and the rear window panel. Therefore, a lower edge of the peripheral portion of the rear window opening is positioned in the rear of the vehicle, narrowing a width of a trunk opening, which is defined as a distance between upper and lower edges of the periphery of the trunk opening. Extending the trunk to the rear of the vehicle to set the width of the trunk opening wider, results in the increased entire length of the vehicle body. Accordingly, modeling freedom of the vehicle body is limited.

An object of the present invention is to provide a rear window structure for a vehicle enabling expansion of the width of the trunk opening without impairing an appearance of the vehicle.

An aspect of the present invention is a rear window structure constructed in a vehicle body, comprising: a window panel; a peripheral portion of a window opening in the vehicle body to which the window panel is fitted, the peripheral portion including a first platform molded to create a step difference toward an inside of a vehicle compartment, and a second platform of a different member from the first platform, molded to create a step difference from an inner circumference of the first platform toward the inside of the vehicle compartment; and an exterior part covering a rim of the window panel, wherein the rim of the window panel is fitted to the second platform of the peripheral portion, and the exterior part is fitted to the first platform thereof.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
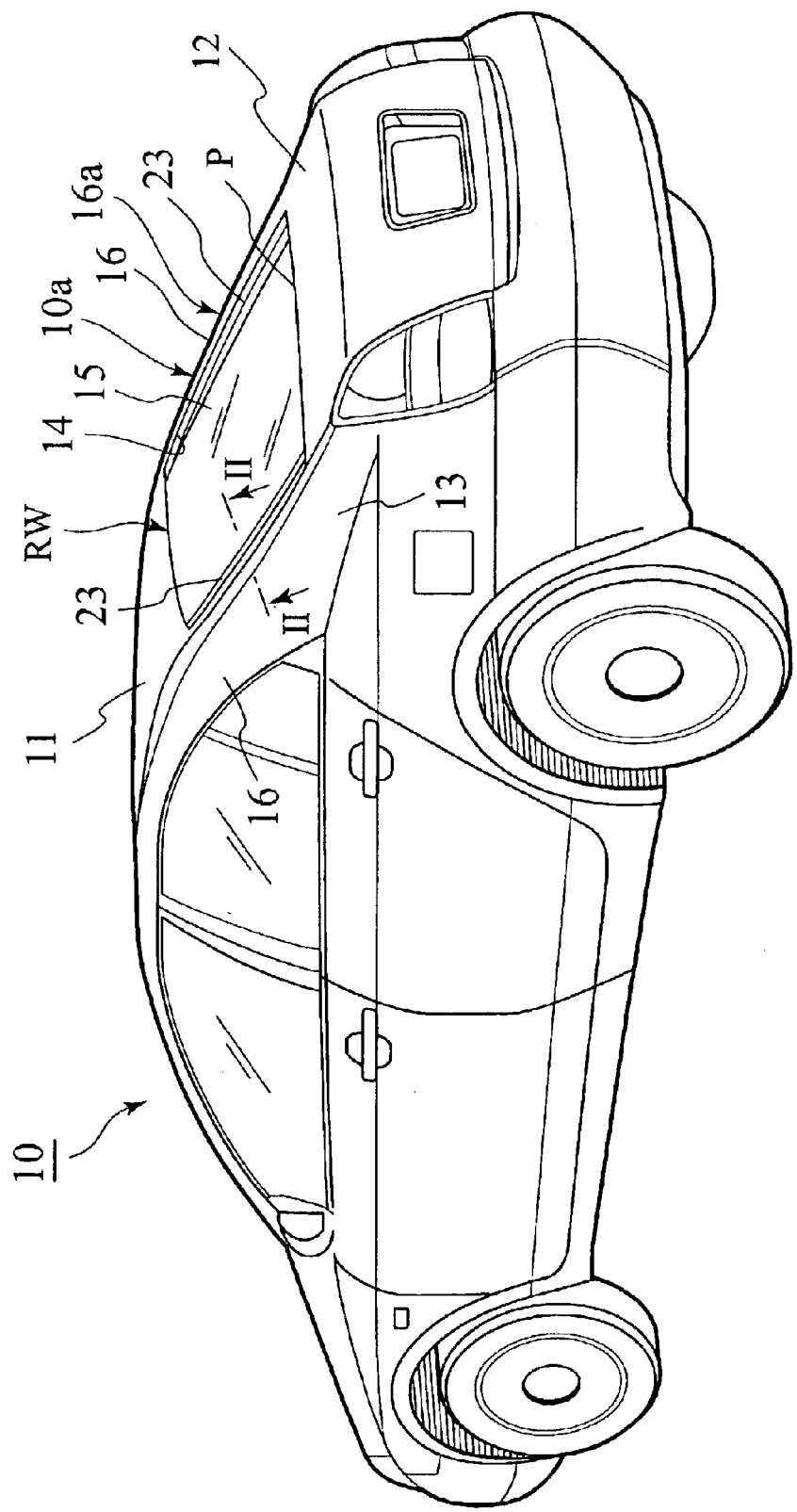
FIG. 1 is a rear perspective view of a vehicle according to a first embodiment of a rear window structure of the present invention.

An embodiment of the present invention will be explained below with reference to the drawings, wherein like members are designated by like reference characters.

As shown in FIG. 1 to FIG. 4, a rear portion of a vehicle body 10 is provided with a rear window opening 14. A rear window panel 15 is fixedly adhered to a peripheral portion 10a of the 6 rear window opening 14 in the vehicle body 10, thus constituting a rear window RW.

Figure 2:
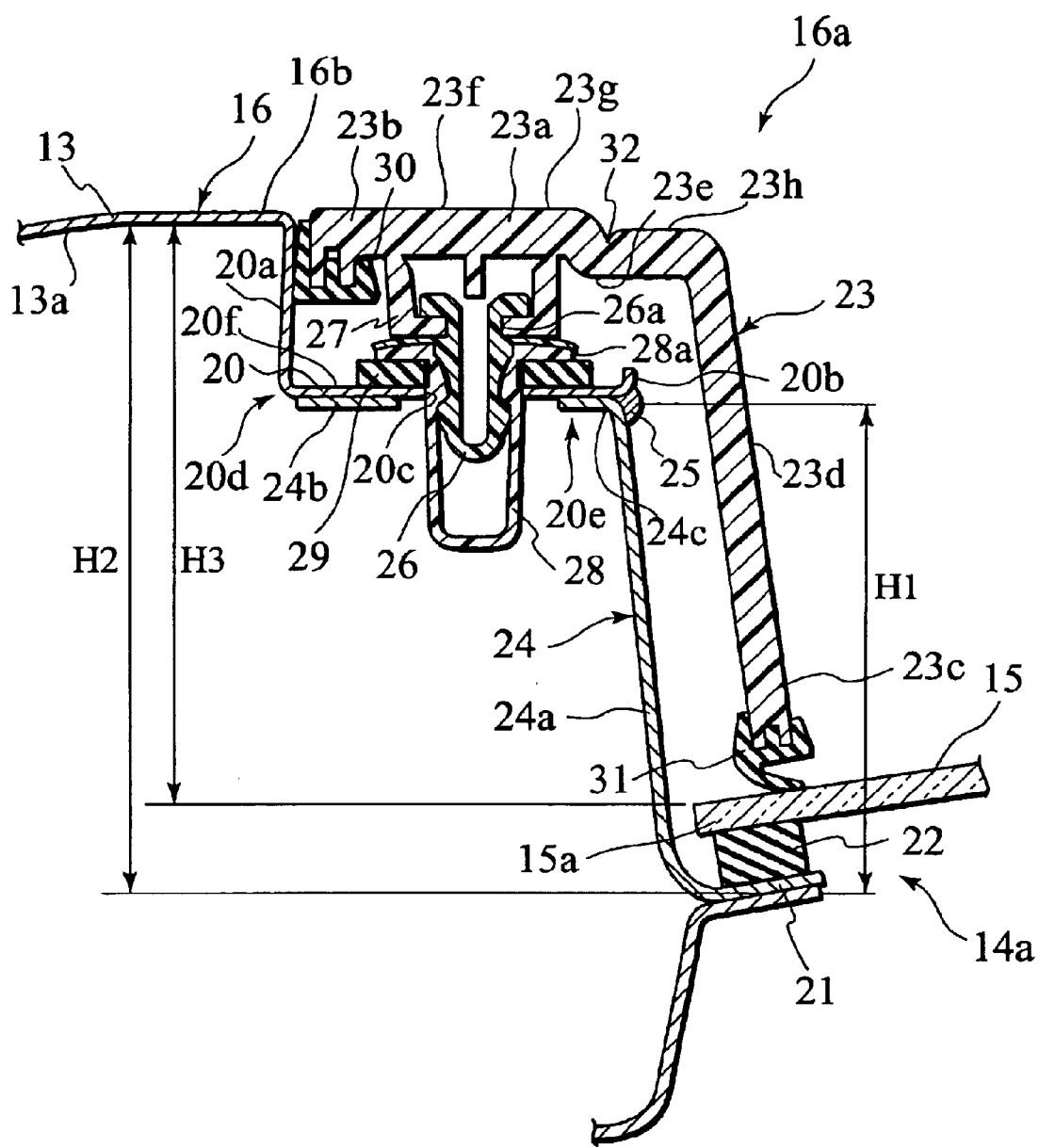
FIG. 2 is an enlarged sectional view taken along the line II—II in FIG. 1, which shows the main portion of the rear window structure of the present invention.
Figure 3:
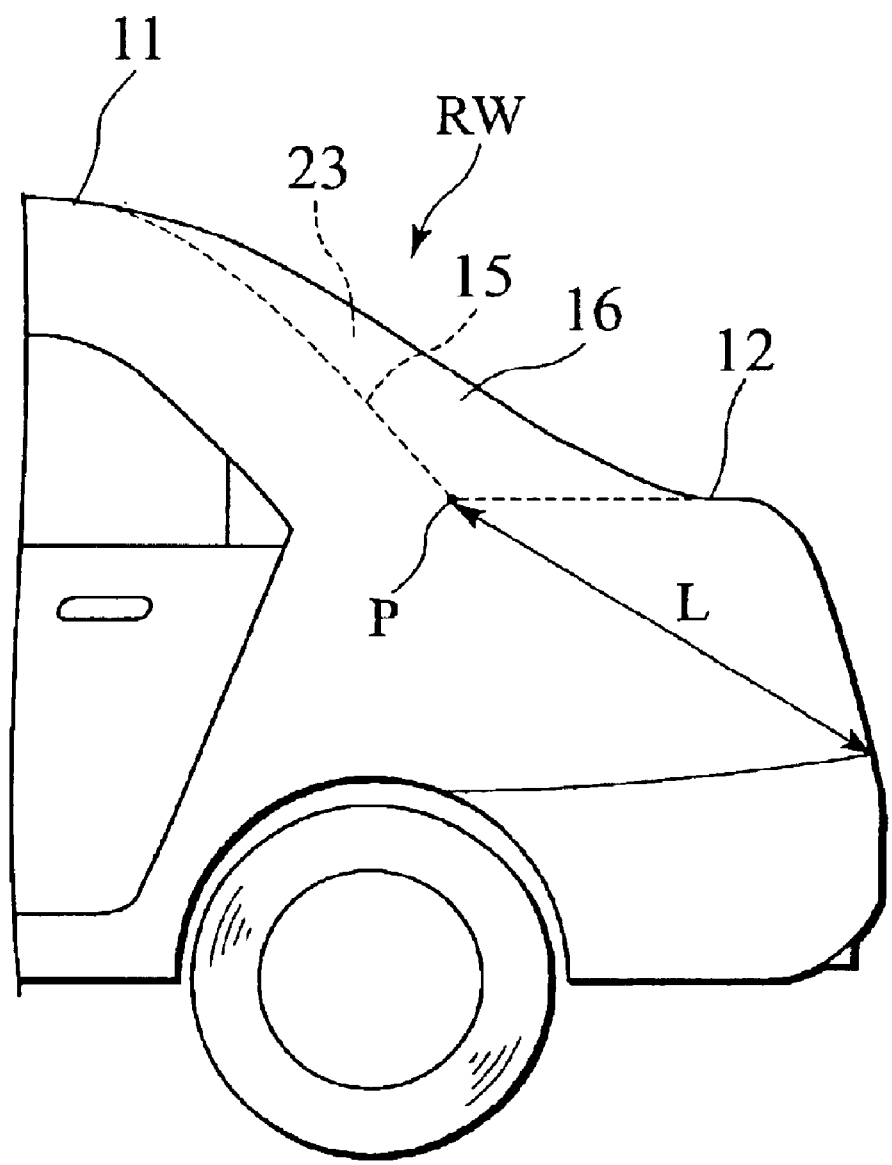
FIG. 3 is a rear side view of the vehicle of FIG. 1, which shows a positional relationship between a trunk opening and a rear window panel.
Figure 4:
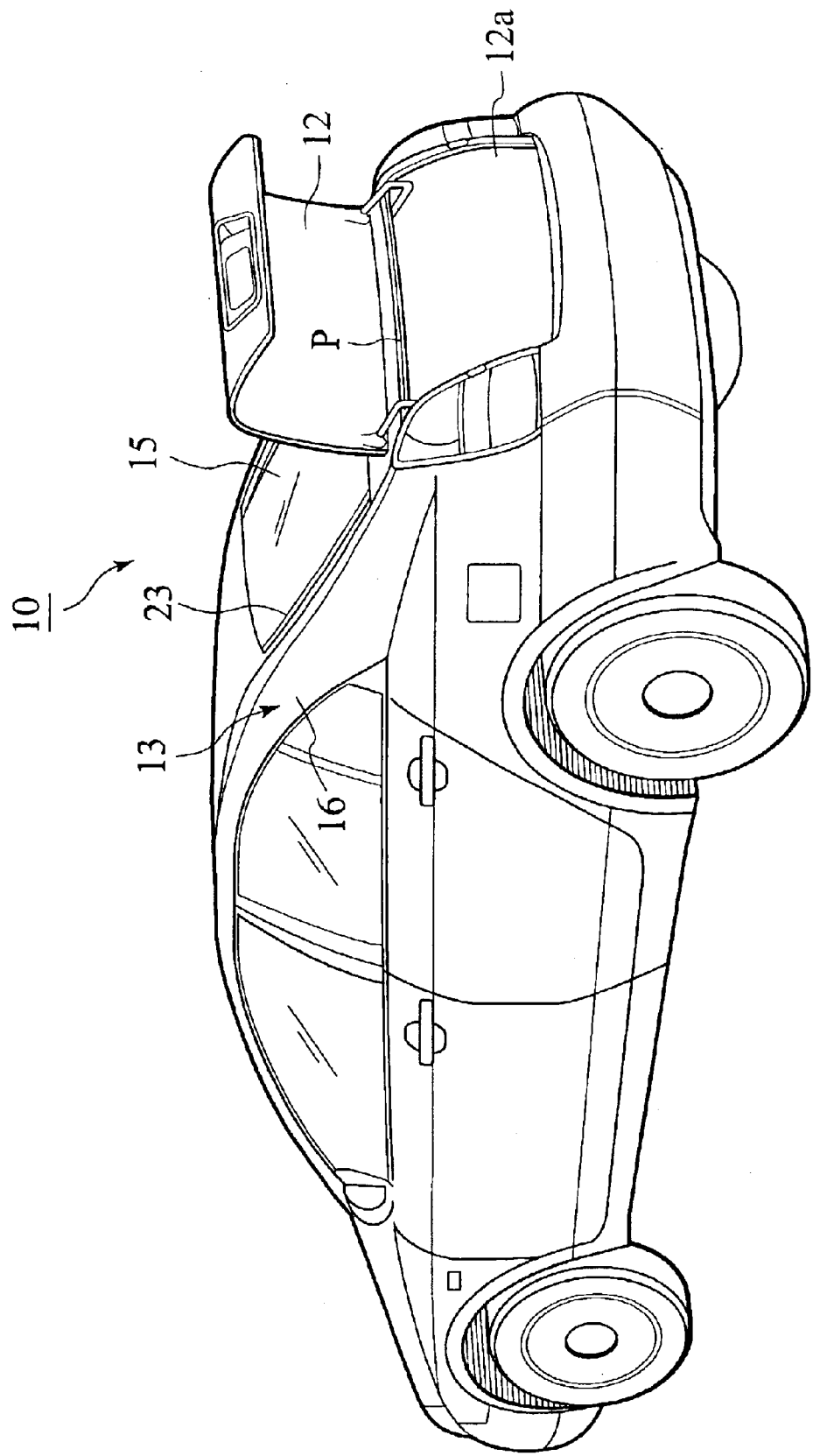
FIG. 4 is a rear perspective view of the vehicle of FIG. 1, which shows a state where a trunk lid thereof is opened.

Each rear pillar 16 of a vehicle body panel 13 is provided on the left and right sides of the rear window RW. As shown in FIG. 2, a peripheral portion 14a of the rear window opening 14 in the rear pillar 16 includes first and second platforms 20 and 21. The first platform 20 is molded to create a step difference toward the inside of the vehicle compartment (a lower part of FIG. 2) from an outer surface 16b of the rear pillar 16, and a second platform 21 is molded to create a step difference further toward the inside of the vehicle compartment from an inner circumference 20e of the first platform 20.

Then, a rim 15a of the rear window panel 15 is adhered to the second platform 21 with a spacer 22 made of elastic material such as a rubber interposed therebetween, and an exterior part 23, which covers the rim 15a of the rear window panel 15, is attached to the first platform 20.

The first platform 20 and a part extending from the first platform 20 to the second platform 21 are formed of different members. The first platform 20 is formed integrally with the vehicle body panel 13 by deep drawing from the vehicle body panel 13, and extends from a lower end 20d of a longitudinal wall 20a toward the inside of the rearwindow opening 14. The longitudinal wall 20a extends from the outer surface 16b of the rear pillar 16 toward the inside of the vehicle compartment. The second platform 21 is formed at the lower end of a connection panel 24, which is connected to the part of the first platform 20 on the vehicle compartment side.

The connection panel 24 is arranged along the rear pillar 16. A flange 24b is formed by bending in the upper end of the connection panel 24, and extends to the outward of the opening 14. The flange 24b is superimposed on the bottom face of the first platform 20 facing the inside of the vehicle compartment, and is spot-welded thereto.

A height H1 of the longitudinal wall 24a extending from an inner periphery 24c of the flange 24b toward the inside of the vehicle compartment, or, the step difference between the first platform 20 and the second platform 21, increases gradually from a roof 11 toward a trunk lid 12. Specifically, while the rear window panel 15 is connected to the roof 11 so as to form a continuous smooth outer surface, the rear window panel 15 is connected to the rear pillar 16 so as to create a step difference which becomes larger in the lower portion of the rear window RW.

At the inner rim of the first platform 20, a warped portion 20b, which is warped toward the outside of the vehicle compartment, is formed. A sealant 25 is applied to the mating part between the warped portion 20b and an upper end portion of the longitudinal wall 24a of the connection panel 24 for water tightness.

The exterior part 23 made of synthetic resin is formed to have a substantially L-shaped section formed with an outside wall 23a which extends along the first platform 20 substantially parallel thereto and an inside wall 23d which extends along the longitudinal wall 24a of the connection panel 24. A clip 26 is provided on the outside wall 23a of the exterior part 23. The exterior part 23 is attached to the first platform 20 via the clip 26.

An engagement groove 26a formed in the upper portion of the clip 26 is fixedly fitted into a boss 27. The boss 27 is integrally formed to protrude from a rear surface 23e of the outside wall 23a. A grommet 28 is fitted into a hole 20c provided on the first platform 20 penetrating through the flange 24b. The grommet 28 is designed to fit the clip 26 therein to and engage the clip 26 therewith. When the clip 26 is inserted into the grommet 28, the exterior part 23 is attached to the first platform 20. The outer surface 23f of the outside wall 23a and the outer surface 16b of the pillar 16 are made to be flush. A watertight washer 29 is interposed between an upper flange 28a of the grommet 28 and the top face 20f of the first platform 20.

Furthermore, an elastic sealing member 30 is attached to the outer rim 23b of the exterior part 23 close to the longitudinal wall 20a of the vehicle body panel 13, and an elastic sealing member 31 is attached to an inner rim 23c thereof close to the rear window panel 15. Thus, the elastic sealing member 30 can tightly contact with the longitudinal wall 20a of the vehicle body panel 13, and the elastic sealing member 31 can tightly contact with the surface of the rear window panel 15 as well.

The exterior part 23 has a narrow v-shaped groove 32 formed on the outer surface 23f of the outside wall 23a. And the outer surface 23f of the outside wall 23a is divided into the inner and outer areas 23g and 23h by the narrow V-shaped groove 32. The inner and outer areas 23g and 23h of the outer surface 23f are colored in different colors.

With the, configuration as described above, in the rear window structure of this embodiment, the second platform 21 for attaching the rear window panel 15 thereto is formed with the connection panel 24 made of a different member from the inner circumference 20e of the first platform 20. Accordingly, a depth H2 from the surface 13a of the vehicle body panel 13 constituting the rear pillar 16 to the second platform 21 can be made larger, and a step difference H3 from the surface 13a of the vehicle body panel 13 to the rear window panel 15 attached to the second platform 21, as well, as illustrated in FIG. 2. Thus, an upper edge P of the periphery of the trunk opening 12a can be positioned further forward in the vehicle, thus making a width L of the trunk opening larger without increasing the entire length of the vehicle body. Furthermore, the height H1 of the wall portion 24a of the connection panel 24 is increased gradually from the roof 11 toward the trunk lid 12 as in the embodiment, whereby it is possible for the upper edge P of the periphery of the trunk opening 12a to be located in the further forward in the vehicle body, while keeping the continuity from the roof 11 to the rear window panel 15 in the upper portion of the rear window RW.

Still further, in the state where the rear window panel is attached to the second platform 21, it is possible to prevent 15 the appearance of the rear window panel 15 from being impaired by covering the rim 15a of the rear window panel 15 and the vehicle body panel 13 by means of the exterior part 23 attached to the first platform 20.

Incidentally, since the exterior part 23 is made of synthetic resin, character lines such as the V-shaped groove 32 or the like can be formed on the outer surface 23f thereof with comparative ease. In addition, the outer and inner areas 23g and 23h of the outer surface 23f divided therein to by the V-shaped groove 32 may be colored in various colors other than the vehicle body color, thus enhancing the appearance thereof.

Furthermore, the elastic sealing members 30 and 31 are attached to the outer rim of the exterior part 23 close to the vehicle body panel 13 and to the inner rim thereof close to the rear window panel 15, respectively. Accordingly, an error in assembly of each the vehicle body panel 13, the rear window panel 15, and the exterior part 23 can be absorbed by the elastic sealing members 30 and 31, with sealing function being maintained.

Still further, since the exterior part 23 can be attached to the first platform 20 simply by one push of the clip 26, the exterior part 23 can be quickly assembled, thus enhancing the workability of a production line thereof.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2002-007627, filed on Jan. 16, 2002, the disclosure of which is expressly incorporated herein by reference in its entirety.

What is claimed is:

1. A rear window structure constructed in a vehicle body, comprising:
    a window panel;
    a peripheral portion of a window opening in the vehicle body to which the window panel is fitted, the peripheral portion including a first platform molded to create a step difference toward an inside of a vehicle compartment, and a second platform of a different member from the first platform molded to create a step difference from an inner circumference of the first platform toward the inside of the vehicle compartment; and
    an exterior part covering a rim of the window panel,
    wherein the rim of the window panel is fitted to the second platform of the peripheral portion and the exterior part is attached to the first platform thereof.

2. The rear window structure according to claim 1, wherein the exterior part is made of synthetic resin.

3. The rear window structure according to claim 1, wherein elastic sealing materials are respectively fitted between the exterior part and the peripheral portion of the window opening in the vehicle body and between the exterior part and the window panel.

4. The rear window structure according to claim 1, wherein the exterior part is attached to the first platform via a clip.

5. The rear window structure according to claim 1, wherein the exterior part is formed to have a wall, which extends along the first platform and becomes flush with the peripheral portion of the window opening, as the exterior part is fitted to the platform.

6. A rear window structure constructed in a vehicle body, comprising:
    a window panel;
    a peripheral portion of a window opening in the vehicle body to which the window panel is fitted, the peripheral portion including a first platform molded to create a step difference toward an inside of a vehicle compartment, and a second platform of a different member from the first platform, molded to create a step difference from an inner circumference of the first platform toward the inside of the vehicle compartment; and an exterior part covering a rim of the window panel, wherein the rim of the window panel is fitted to the second platform of the peripheral portion, and the exterior part is fitted to the first platform thereof, and wherein a step difference between the first platform and the second platform gradually increases from a roof toward a trunk lid.

7. A rear window structure constructed in a vehicle body, comprising:

a window panel;

a peripheral portion of a window opening in the vehicle body to which the window panel is fitted, the peripheral portion including a first platform molded to create a step difference toward an inside of a vehicle compartment, and a second platform of a different member from the first platform, molded to create a step difference from an inner circumference of the first platform toward the inside of the vehicle compartment; and an exterior part covering a rim of the window panel, wherein the rim of the window panel is fitted to the second platform of the peripheral portion, and the exterior part is fitted to the first platform thereof, and wherein the first platform has, on its inner circumference, a warped portion warped toward outside of the vehicle compartment.

* * * * *